J. DESCHAMPS.
Hydrostatic Scale.

No. 232,245. Patented Sept. 14, 1880.

Attest:
J. Henry Kaiser.
James M. Wright Jr.

Inventor:
Jules Deschamps.
By James L. Norris
Atty.

UNITED STATES PATENT OFFICE.

JULES DESCHAMPS, OF PARIS, FRANCE.

HYDROSTATIC SCALE.

SPECIFICATION forming part of Letters Patent No. 232,245, dated September 14, 1880.

Application filed December 8, 1879. Patented in France March 21, 1879.

*To all whom it may concern:*

Be it known that I, JULES DESCHAMPS, of Paris, in the Republic of France, have invented a new and useful Improved Hydrostatic Scale, which improvement is fully set forth in the following specification.

This invention relates to that class of hydrostatic scales which comprise a fluid-receiving vessel and an inner vessel floating in the water.

My invention consists in the combination of the fluid-receiving vessel and the floating or weighing vessel with a graduated-scale index carrying an upper and a lower set of friction-rollers carried by arms projecting from the inner surface of the fluid-receiving vessel, and serving to guide and center the weighing-vessel as it rises and sinks within the fluid-receiving vessel.

It also consists in the combination, with the fluid-receiving vessel and weighing-vessel contained therein, of a float also contained in said weighing-vessel, and having a stem projecting above the top of the same, and provided with an index-finger arranged to move before the graduated scale, said parts being constructed and arranged substantially as set forth.

Figure 1:
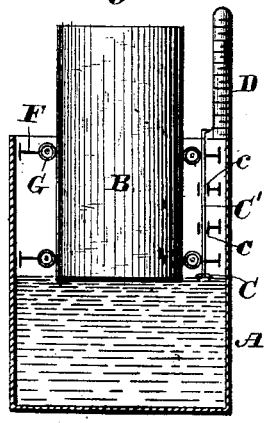
Figure 2:
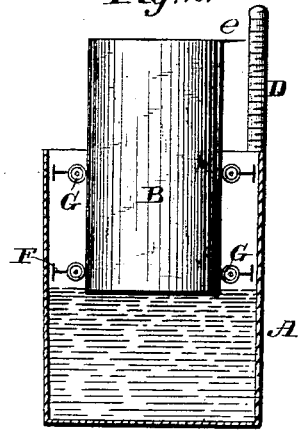
Figure 3:
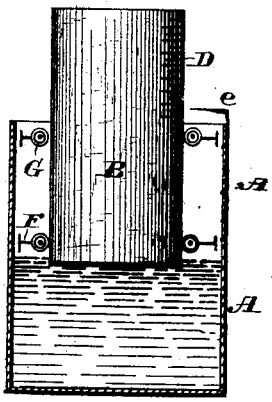
Figure 4:
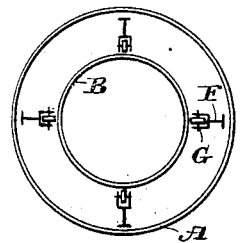

Figures 1, 2, and 3 are sectional views taken on a vertical plane through the fluid-receiving vessel, and show the inner vessel floating upon the water. These figures also illustrate the guide-rollers and the several ways in which the scale and index may be arranged. Fig. 4 is a transverse section taken on a horizontal plane through the two vessels.

A designates the fluid-receiving vessel, which is to be partly filled with water, as shown in the first three figures. B designates the inner vessel, in which the articles to be weighed are placed.

In order to center the inner vessel within the fluid-receiving vessel A, a series of horizontal rods, F F, are secured to the inner side of the vessel A, and provided at their ends which are adjacent to the vessel B with anti-friction rollers G. There are two sets of these anti-friction rollers and their supporting-rods, one set being near the upper rim of the vessel A and the remaining set somewhat farther down in the vessel, so that the inner vessel, B, will be accurately centered and guided as it rises or falls, according to the weight of the article placed within it.

D designates a graduated scale, either formed upon the vessel B or upon a rod secured to the vessel A; and *e* represents the index, which may be applied to either of the two vessels, according to the location of the scales.

In Fig. 1 a float, C, is employed in connection with the vessel B. The stem C' of this float passes up through guides *c*, and has at its upper end an index, which is arranged to indicate on a scale, D, the height of the fluid in the vessel A when the vessel B is depressed by the article which is being weighed. This float is arranged in the space between the weighing and outer vessel, where the surface of the fluid in practice is less than that upon which the weighing-vessel sits, and consequently its range of movement is greater than that of the weighing-vessel, so that the graduations of its scale may be made much farther apart and more easily observable than when the pointer is on the weighing or outer vessel, and the stem may be of such length as to bring the scale above the outer vessel to a convenient position for observation.

The scales are graduated with reference to any approved system of measure, and with reference to the relation of the diameter of the floating vessel to the receiving-vessel.

I am aware that a hydrostatic scale has heretofore been composed of an outer vessel and inner vessel resting upon a fluid within the same, the outer vessel being provided with a scale and an opening in its wall covered with a transparent substance, through which the rise and fall of the liquid with relation to the scale may be observed; but in such a scale the inner or weighing vessel is not guided or centered in the outer vessel, and the observation of the rise and fall of the liquid is difficult and inconvenient, as, owing to the intervening transparent substance, the eye of the observer must be on a level with the surface of the liquid in order to accurately note its position.

I am also aware that the pan of a spring-scale has been provided with a hollow stem inclosing the spring upon which the pan stands, the lower end of said hollow stem being provided with friction-rollers embracing a central guide, and an outer inclosing-case having journaled at its upper edge friction-rollers, against which the upper portion of the said hollow stem moves. The two sets of friction-rollers guide and center the stem; but the arrangement is complicated and awkward, and the apparatus incapable of use as a hydrostatic scale. I lay no claim to either of these old inventions referred to.

What I claim is—

1. As an improvement in hydrostatic scales, the combination of the fluid-receiving vessel A and the inner floating and weighing vessel, B, with upper and lower sets of radial roller-supporting rods secured to the inner side of the fluid-receiving vessel A, the anti-friction rollers F, journaled at the inner ends of said rods, the scale D, and an index, e, substantially as shown and specified.

2. The combination, in hydrostatic scales, of the outer fluid-receiving vessel, A, inner floating vessel, B, roller supporting rods F, anti-friction rollers G, float C, float-stem C', guides c, and an index and graduated scale, all arranged substantially as set forth.

3. The combination, in hydrostatic scales, of the fluid-receiving vessel A, floating vessel B, a graduated scale, and a float, C, having an index upon the upper end of its rod, as shown, and for the purpose specified.

In testimony whereof I have signed my name to this specification before two subscribing witnesses.

J. DESCHAMPS.

Witnesses:
EMILE BARRAULT,
AUG. VINCK.